United States Patent [19]

Groth et al.

[11] Patent Number: 4,575,007

[45] Date of Patent: Mar. 11, 1986

[54] MIXING CONTROL FOR WATER AND CLEANING FLUID

[75] Inventors: Hugh F. Groth, Richfield, Ohio; Peter A. Basile, East Windsor, N.J.

[73] Assignee: Regina Corporation, Rahway, N.J.

[21] Appl. No.: 585,610

[22] Filed: Mar. 2, 1984

[51] Int. Cl.[4] .......................... F16K 11/14; B05B 7/26

[52] U.S. Cl. .................................... 239/310; 137/898; 137/863

[58] Field of Search ................ 239/304, 310; 137/605, 137/607, 863, 871, 898; 251/9

[56] References Cited

U.S. PATENT DOCUMENTS

| | | |
|---|---|---|
| Re. 25,939 | 12/1965 | Krammes . |
| D. 62,160 | 3/1923 | Wipf . |
| D. 173,430 | 11/1954 | Hills . |
| D. 210,444 | 3/1968 | Cortina . |
| D. 233,414 | 10/1974 | Avolio . |
| D. 241,817 | 10/1976 | Campbell et al. . |
| 1,632,515 | 6/1927 | Smith . |
| 1,713,902 | 5/1929 | Hartman . |
| 1,726,741 | 9/1929 | Keller . |
| 1,910,325 | 3/1933 | Finnel . |
| 2,168,692 | 8/1939 | Vidal . |
| 2,223,963 | 12/1940 | Nadig . |
| 2,243,935 | 6/1941 | Williamson . |
| 2,576,669 | 11/1951 | Bramhall . |
| 2,954,576 | 10/1960 | Helm . |
| 2,955,674 | 10/1960 | Krammes . |
| 2,991,939 | 9/1959 | Packard . |
| 3,002,214 | 10/1961 | Krammes . |
| 3,027,834 | 3/1962 | Christian . |
| 3,040,362 | 6/1962 | Krammes . |
| 3,040,363 | 6/1962 | Krammes et al. . |
| 3,060,956 | 10/1962 | Menzie . |
| 3,061,959 | 11/1962 | Blumenfeld . |
| 3,101,505 | 8/1963 | Belicka et al. . |
| 3,207,444 | 9/1965 | Kelley et al. . |
| 3,208,639 | 9/1965 | Marwell et al. . |
| 3,260,464 | 7/1966 | Harant . |
| 3,403,803 | 10/1968 | Markowitz . |
| 3,426,931 | 2/1969 | Jensen . |
| 3,491,398 | 1/1970 | Segesman . |
| 3,540,072 | 11/1970 | Wolter et al. . |
| 3,542,240 | 11/1970 | Soloway . |
| 3,572,532 | 3/1971 | Shannon . |
| 3,572,964 | 3/1971 | Dyer . |
| 3,752,362 | 8/1973 | Risener . |
| 3,883,301 | 5/1975 | Emrick et al. . |
| 3,896,521 | 7/1975 | Parise . |
| 3,926,327 | 12/1975 | Schickedanz . |
| 3,939,527 | 2/1976 | Jones . |
| 3,940,826 | 3/1976 | Phillips et al. . |
| 3,959,844 | 6/1976 | Cyphert . |
| 3,974,541 | 8/1976 | Silvis et al. . |
| 4,011,288 | 3/1977 | Assenheimer et al. . |
| 4,114,229 | 9/1978 | Jones et al. . |
| 4,137,930 | 2/1979 | Scholle . |
| 4,197,942 | 4/1980 | Gacki et al. . |
| 4,214,675 | 7/1980 | Schmit . |
| 4,236,651 | 12/1980 | Meyer et al. . |
| 4,281,775 | 8/1981 | Turner . |
| 4,296,786 | 10/1981 | Brignola . |
| 4,333,203 | 6/1982 | Yonkers . |

*Primary Examiner*—Andres Kashnikow
*Assistant Examiner*—Kevin Patrick Weldon
*Attorney, Agent, or Firm*—M. Lukacher

[57] ABSTRACT

An in-line switch and mixer control including a first restriction adjacent the outlet of a mixing device having a cleaning fluid and water inlet for controlling the flow rate from the mixer and a second restriction connected to the water inlet for varying the restriction of the water inlet to determine the mixing ratio. Initially, the first restriction is totally closed preventing any flow from the mixer and the second restriction is initially unrestricted. The first and second restrictions include a common actuator for sequentially operating the first and second restrictions to various intermediate restrictive positions.

14 Claims, 24 Drawing Figures

FIG. 9
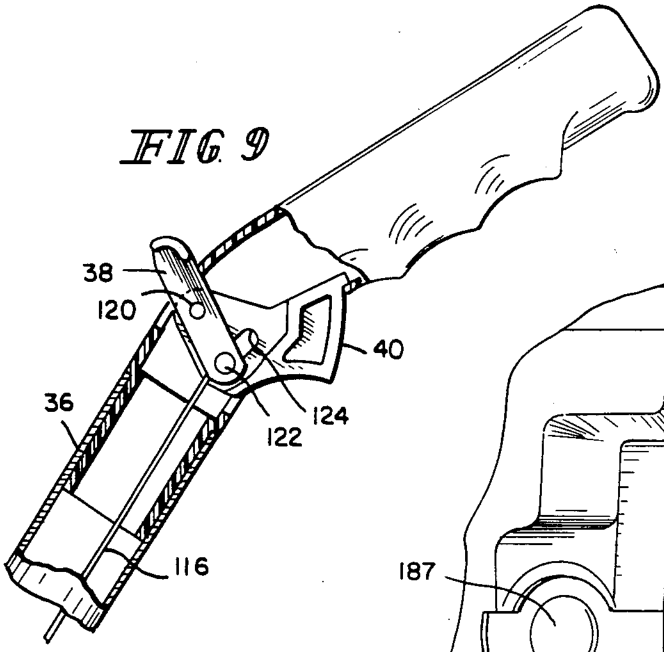
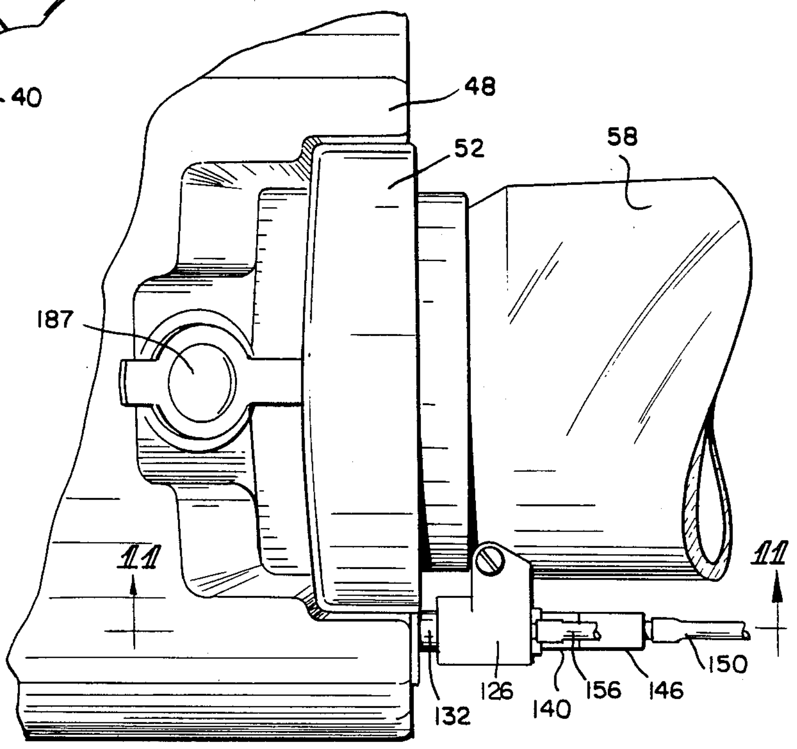
FIG. 10
FIG. 11
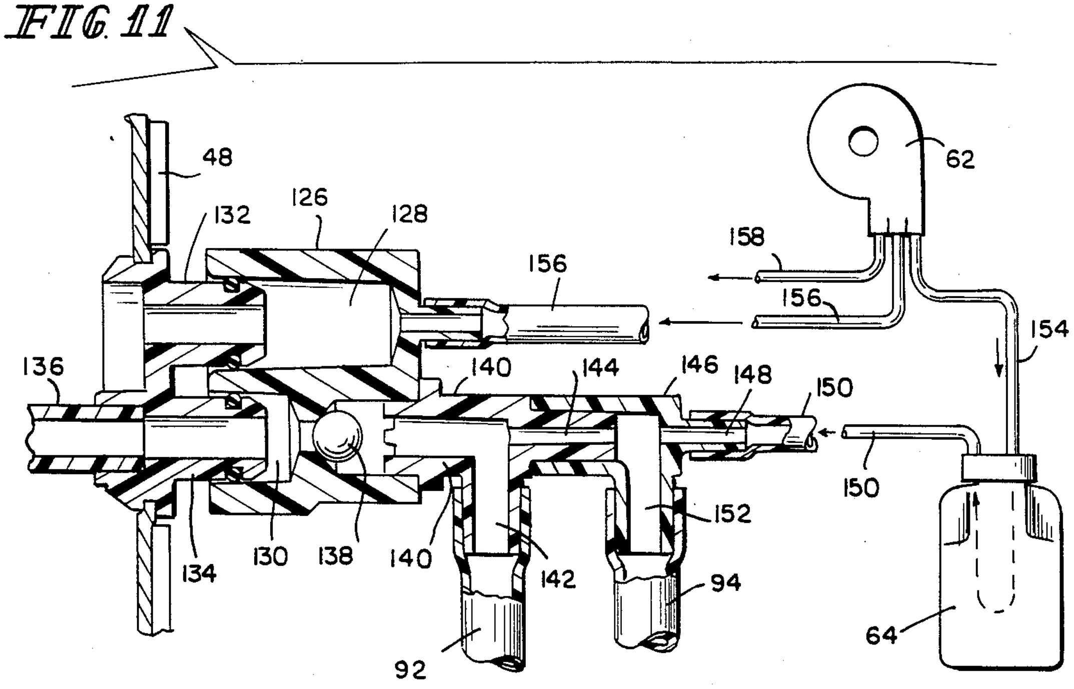

MIXING CONTROL FOR WATER AND CLEANING FLUID

BACKGROUND AND SUMMARY OF THE INVENTION

The present invention relates generally to cleaning devices and more specifically to an improved in-line switch and mixer control for cleaning devices.

In the early prior art, the cleaning fluid is generally pre-mixed to the desired ratio of cleaning fluid water and the only control provided was whether the cleaning fluid mixture was to be dispensed or not. In later developments, separate water sources and cleaning fluid sources were provided. They each generally included a valve at the bottom of the tank with operators to activate the valves to provide no cleaning fluid mixture, water alone, or water and cleaning fluid in a pre-set mixture as a function of the valves. A typical example of such a system is provided in U.S. Pat. No. 3,540,072. The systems generally could not control the mixture or the flow rate and use gravity projection onto the cleaning surface.

Another type of prior art system uses a pressurized source of water and an electric control solenoid to dispense the water and generally include a flow restriction at the outlet of a source concentrated cleaning fluid for adjusting the mixing ratio to the desired value. A typical example of this system is found in U.S. Pat. No. 3,940,826. These systems generally have the cleaning ratio set for the entire operation since the control is usually remote from the operator's handle.

Thus, it is an object of the present invention to provide a combined switch and mixer control.

Another object of the present invention is to provide a switch and mixer control which may be activated at the handle by the operator.

Still another object of the present invention is to provide a switch and mixer control which sequentially operates through a plurality of flow rate positions as well as mixing positions.

These and other objects of the invention are attained by providing a control adjacent a mixing device having cleaning fluid and water inlets and a cleaning fluid mixture outlet. The control device includes a first restriction connected to the outlet for determining the flow rate from the mixer and a second restriction connected to the water inlet for determining the mixing ratio. The two restriction devices include a stationary anvil adjacent the mixture outlet and water inlet respectively and a rocker arm having a pair of hammers thereon opposite the mixture outlet and the water inlet respectively for producing the variable restrictions. The rocker arm is biased to a first pivotal position wherein the mixture outlet is completely restricted and may be rotated through a first plurality of intermediate positions defining intermediate restrictions of the mixture outlet and a second plurality of intermediate angular positions defining intermediate restrictions of the water inlet.

Other objects, advantages and novel features of the present invention will become apparent from the following detailed description of the invention when considered in conjunction with the accompanying drawings.

BRIEF DESCRIPTION OF THE DRAWINGS

FIG. 9 is a cross-sectional view of the trigger and spotting actuator assembly incorporating the principles of the present invention.

FIG. 10 is a top view of a portion of the water tank and separator assembly.

FIG. 11 is a combined cross-sectional view taken along lines 11—11 of FIG. 10 and a fluid schematic of the fluid system incorporating the principles of the present invention.

DETAILED DESCRIPTION OF THE DRAWINGS

Figures 1, 2:
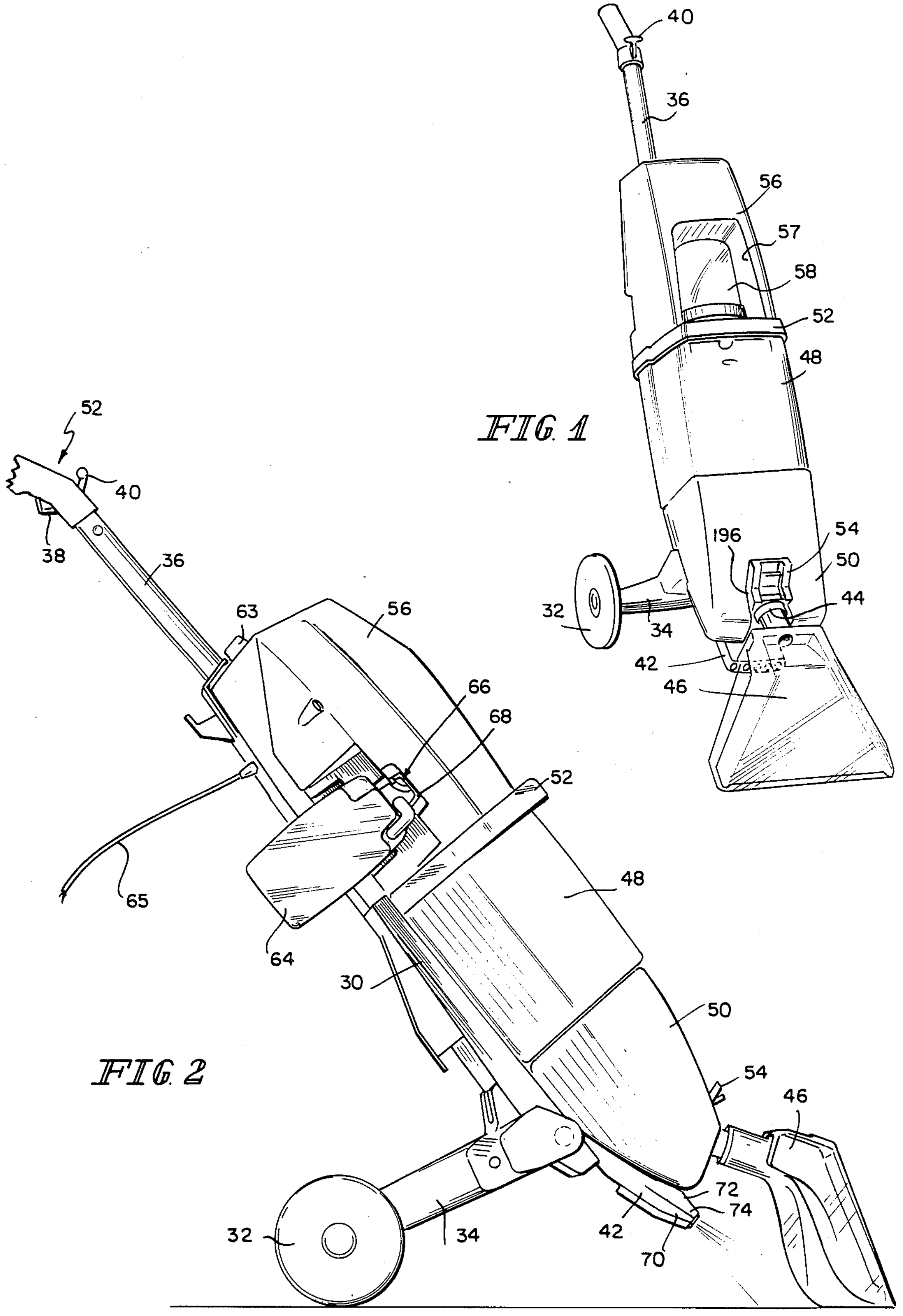
FIG. 1 is a perspective of a cleaning device incorporating the principles of the present invention.
FIG. 2 is a side view of the cleaning device of FIG. 1.
Figure 3:
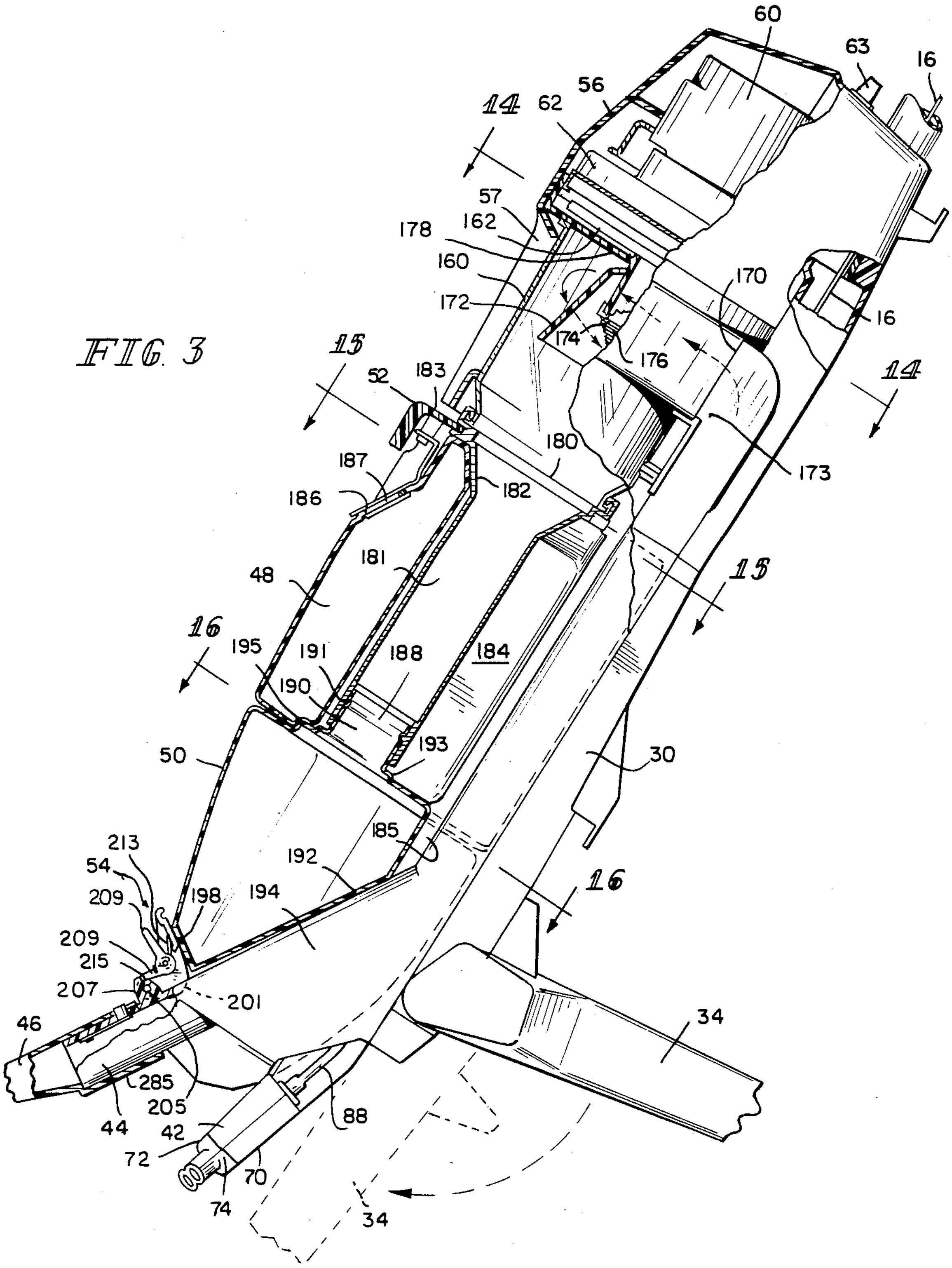
FIG. 3 is a partial cross-sectional view of the cleaning device taken along lines 3—3 of FIG. 2.

A cleaning device according to the present invention is illustrated in FIGS. 1, 2 and 3 as including a frame 30 to which are mounted a pair of wheels 32 by strut 34. As illustrated in FIG. 2, the wheels are in their operable position allowing the cleaning device to move across the surface to be cleaned. For the stored position, the wheels are rotated forward or counter-clockwise in FIG. 2 and comes to rest below the front end of the frame 30. Extending from the top end of the frame 30 is a handle 36 having fluid activation trigger 38 and a spotter actuator 40. Mounted to the front end of the frame is a spray nozzle 42 for projecting cleaning fluid mixtures onto the surface to be cleaned and a suction nozzle 46 mounted to pipe 44 for removing fluids from the surface to be cleaned.

A water tank 48 and waste fluid or return tank 50 are connected as a single unit including a handle 52. The tanks are removably mounted to the frame 30 and are secured thereto by a cam latch 54 engaging the bottom of the waste fluid tank 50. An upper housing 56 mounted to frame 30 above the tank unit includes an air fluid separator 58, a motor 60 and a pump or fan 62 as illustrated in FIG. 3. An opening 57 is provided in the upper housing 56 to view the fluid in the separator 58 which has a transparent body. An electrical switch 63 activates the motor 60 and an electric cord 65 provides power.

A container or cartridge of detergent, shampoo or other concentrated cleaning fluid 64 including a collar 66 is mounted to docking port 68 in the upper housing 56 as illustrated in FIG. 2. The cleaning fluid is mixed with water from the water tank and projected through spray nozzle 42.

Initially, the water tank 48 is filled with fluid and mounted to the frame 30 and securely held thereto by cam latch 54. A concentrated cleaning fluid cartridge 64 is mounted into docking port 68. Now the system is ready for operation. As will be explained more fully below, the cleaning device operates by activating the motor 63 to turn on the motor to operate the fan and pump 62 to create a force to project a mixture of cleaning fluid and water out of spray nozzle 42 on the surface as well as to create a suction to draw fluid through suction nozzle 46. With the trigger 38 in its normal position, no fluid is dispensed. Upon depressing trigger 38, the amount of fluid projected from spray nozzle 42 can be controlled. If a stubborn stain or especially dirty surface is to be cleaned, the spotting actuator 40 is operated to increase the mixing ratio of detergent to water. The dirty or waste fluid from suction nozzle 46 is provided to separator 58 wherein the air is separated from the dirty fluid which is provided to waste fluid tank 50. The air is provided back through the fan/pump 62 to be re-introduced to the spray nozzle 42. Once the cleaning is done, the tank assembly is removed by releasing cam latch 54 and the contents of the waste fluid tank 50 are emptied. This cycle of operation may be repeated.

Figure 4:
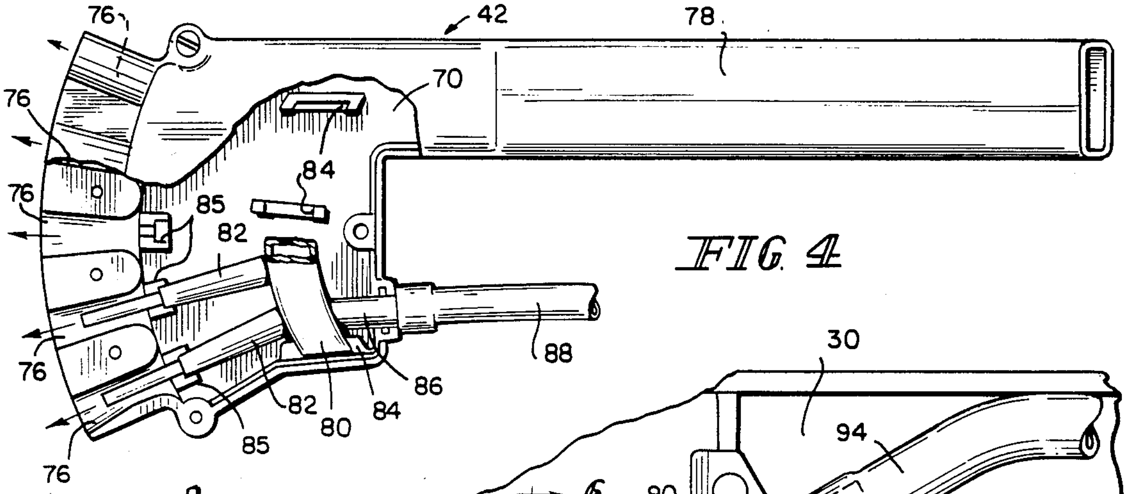
FIG. 4 is a cross-sectional view of the spray nozzle incorporating the principles of the present invention.
Figure 6:
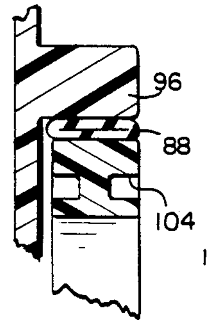
FIG. 6 is a cross-sectional view taken along lines 6—6 of FIG. 5.

The spray nozzle 42, which is illustrated in detail in FIG. 4 is an air venturi system which draws a cleaning fluid mixture and projects it onto the cleaning surface. Spray nozzle 42 includes an air manifold having two complementary pieces 70 and 72 joined along a line or plane 74 (see FIG. 2). As illustrated in detail in FIG. 4 with the top air manifold 72 removed, the nozzle of the air manifold is generally fan-shaped having a plurality of nozzle channels 76 extending therethrough. Unitary to the air manifold is an inlet tube or conduit 78 connected to a source of pressurized air or the output of the fan 62. Mounted interior the air manifold is a fluid manifold 80 having a plurality of fingers 82 extending therefrom and lying in the nozzle channels 76. Supports 84 and 85, which are integral with the air manifold elements 70 and 72, position the fluid manifold 80 and its fingers 82 central within the air manifold and supports 84 and the nozzle channels 76. The fluid manifold 80 includes an inlet 86 extending through the back wall of the air manifold and is connected by tubing 88 to the source of a cleaning fluid mixture.

Air introduced into conduit 78 moves through the air manifold around the liquid manifold 80 and fingers 82 and exit nozzle channels 76. The restriction of the air through the nozzle channels creates a venturi effect so as to draw or educe cleaning fluid mixture from the fingers 82 to be forceably ejected onto a surface to be cleaned. Although the system has been designed to operate on a pure eduction principle, it is preferred that the source of cleaning fluid mixture be pressurized so as to maintain an even flow of cleaning mixture fluid to the spray nozzle 42. Since the principle force to draw the cleaning fluid mixture is the venturi effect produced by the air manifold, the pressure provided to the cleaning fluid source is substantially smaller than that provided to the air manifold.

The cleaning fluid mixture provided to the spray nozzle 42 by tubing 88 is from a control switch and mixer illustrated specifically in FIGS. 5–8 and operated by the trigger actuator 40 and the spotting actuator 38 illustrated in detail in FIG. 9. A mixing V or connector 90 which is mounted to the frame 30 has a mixing outlet connected to tube 88, a water inlet connected to tube 92 and a cleaning fluid inlet connected to tubing 94. The water from tube 92 and the cleaning fluid from tube 94 are mixed in the V 90 and provided to outlet tube 88. Engaging one side of the outlet tube 88 is an anvil 96 and adjacent one side of the water inlet tube 92 is an anvil 98. Pivotally connected to the frame 30 at 100 is a rocker arm 102 having hammers 104 and 106 respectively on opposite sides of the pivot 100. A biasing means or spring 108 is received in a spring housing 110 on the frame 30 and engages the rocker arm 102 around post 112. The biasing means or spring 108 biases the rocker arm 102 counter-clockwise in FIG. 5. A slot 114 in the rocker arm 102 receives a control link or wire 116 connected to the spotter actuator 40 and the trigger 38.

Figure 5:
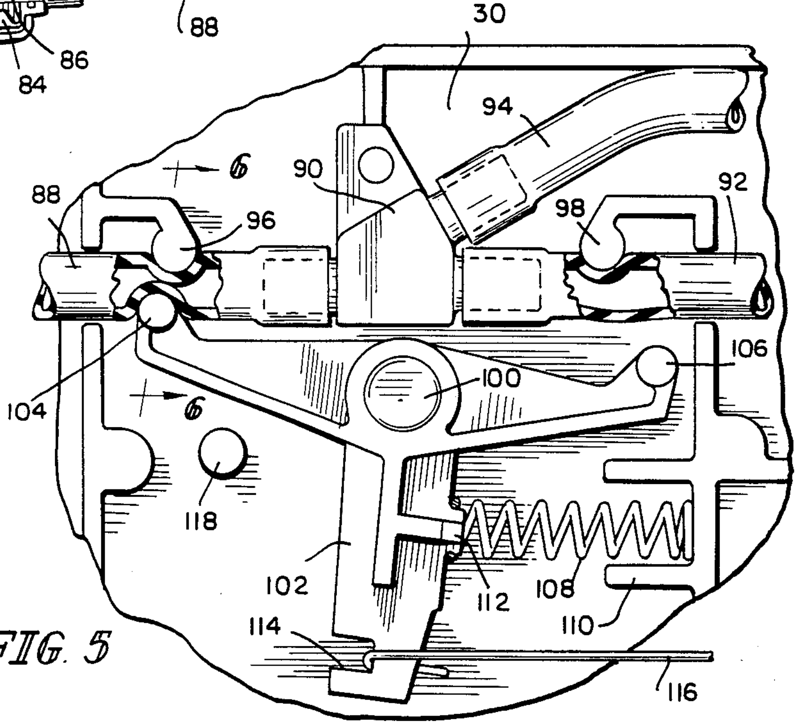
FIG. 5 is a plan view of a control switch and mixer in its initial closed position incorporating the principles of the present invention.

Without operation of the trigger 38 or spotting actuator 40, spring 108 rotates the rocker arm 102 to its initial position illustrated in FIG. 5 such that hammer 104 is pressed against anvil 96 completely restricting the tubing 88 at the outlet of the mixer 90. This is illustrated specifically in the cross-section of FIG. 6. In this position, no cleaning fluid mixture is provided to the spray nozzle 42. Thus, if the electric motor is actuated, only air is blown onto the surface to be cleaned. This could produce an air drying if desired.

With movement of the control wire 116 to the right, the rocker arm 102 rotates counter-clockwise moving the hammer 104 away from the anvil 96 so as to begin to open the closed outlet tube 88. Dependent upon the amount of motion of wire 116 and pivotal rotation of rocker arm 102, the flow rate of cleaning fluid mixture can be controlled. The rocker arm 102 can be rotated to a position allowing unrestricted flow of the outlet tube 88 as well as unrestricted flow from water inlet tubing 92.

Figure 7:
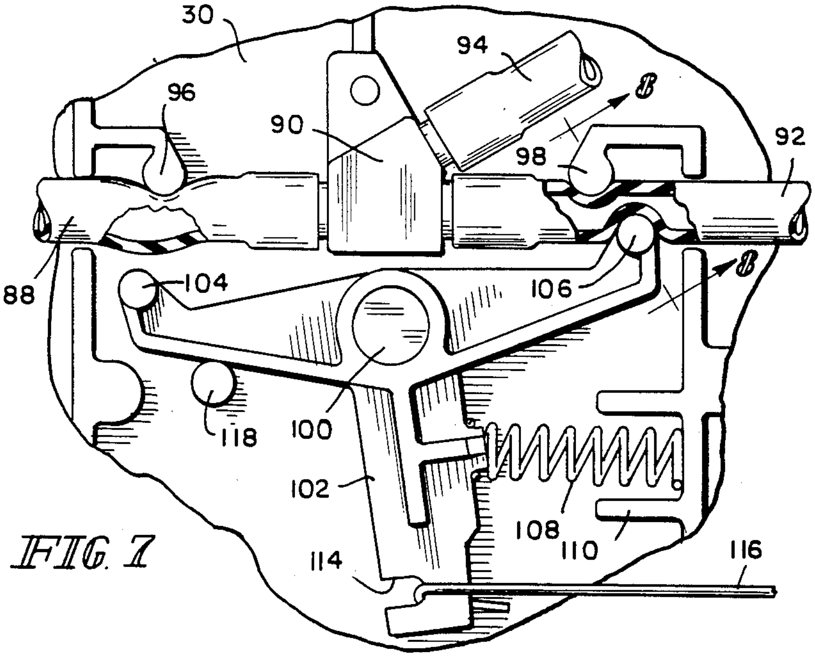
FIG. 7 is a plan view of the control switch and mixer in its spotting position.
Figure 8:
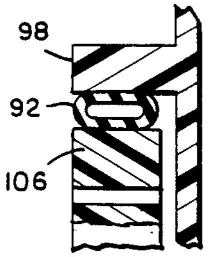
FIG. 8 is a cross-sectional view taken along lines 8—8 of FIG. 7.

Further rightward motion of wire 116 and counter-clockwise rotation of rocker arm 102 causes hammer 106 to engage the water inlet tube 92 and being restricting its flow into the mixing V 90. The degree of restriction of water inlet 92 permitted is defined by a stop 118 and is illustrated in FIGS. 7 and 8. This restricted position of water inlet tube 92 defines a specific ratio of concentrated cleaning fluid from tube 94 and water from tube 92 to remove stubborn stains or spots and is known as the spotting position.

Thus, it can be seen that the rocker arm 102 sequentially operates from a first position illustrated in FIG. 5 wherein the outlet is restricted by anvil 96 and hammer 104 for zero flow rate through a first plurality of intermediate angular positions having intermediate restrictions of the outlet to define various flow rates and a second plurality of intermediate angular positions having intermediate restrictions of the water inlet 92 provided by anvil 98 and hammer 106 to define the mixing ratio. Thus, a single assembly is provided which controls both the flow rate of dispensing cleaning fluid mixture as well as the mixing ratio of cleaning fluid to water. If required, the rocker arm can be reshaped such that hammer 106 will begin to restrict water inlet tube 92 while hammer 104 also restricts outlet tube 88.

The operation of the rocker arm 102 is controlled via wire 116 by the spotting actuator 40 and trigger 38 illustrated in detail in FIG. 9. The spotting actuator 40 is pivotally mounted to the handle 36 at 120 as is trigger 38. The control wire 116 is connected to post 122 on spotting actuator 40. Post 122 lies in a elongated slot 124 in the trigger 38. The spotting actuator 40 extends from the top of the handle while the trigger 38 extends from the bottom of the handle. This allows activation of either control with the same hand that holds and directs the cleaning device. The spotting actuator 40 may be controlled by the thumb and the trigger 38 by the other fingers which wrap about the handle 36.

Counter-clockwise rotation of trigger 38 as illustrated in FIG. 9 from its initial position causes counter-clockwise rotation of the spotting actuator 40 and moves the control wire 116 to the right. The trigger 38 is designed such that the total amount of angular motion which it is capable of travelling is limited to produce via control wire 116 rotation of the rocker arm 102 from the fully restricted condition of outlet tube 88 of mixer 90 to the completely unrestricted condition of outlet tube 88 and no restriction of the water inlet tube 92. The restriction of water inlet tube 92 by hammer 106 is produced by the further motion by travel produced by spotting actuator 40. The counter-clockwise rotation of spotter actuator 40 moves the wire 116 further to the right without further motion of trigger 38 since post 122 moves in slot 124. It should also be noted that spotter actuator 40 may be operated independent of trigger 38 because of the slot 124. The biasing means 108 of rocker arm 102 is sufficiently strong to clamp the outlet tubing 88 and retains the spotting actuator 38 and trigger 40 in their position illustrated in FIG. 9 via wire 116.

The water line 92 and the cleaning fluid line 94 of the mixing V 90 are connected to the fluid circuit illustrated in FIG. 11. A block 126 includes an air port 128 and a water port 130. An air inlet nipple 132 and a water outlet nipple 134 are provided in the top of water tank 48. A tube 136 extends down from the water outlet nipple 134 to the bottom of the water tank 48. The nipples 132 and 134 are received in ports 128 and 130 respectively of the block 126. As will be explained more fully below, the block 126 is mounted to the separator 58 to receive the nipples 132 and 134 during mounting of the tank assembly onto the frame as illustrated in FIG. 10. A ball 138 in water port 130 acts as a check valve to prevent back flow into the water tank 48.

Connected to the other end of water port 130 is a first fitting 140 having a main outlet 142 connected to the mixing water inlet tube 92 and a restricted outlet 144. The axis of the inlet of fitting 140 is coincident with the axis of the restricted outlet 144 and is orthogonal to the main outlet 142 axis. The cross-sectional area of main outlet 142 is substantially larger than the cross-sectional area of restricted outlet 144. By way of example, the main outlet may have a cross-sectional area four times that of the restricted outlet.

Connected to the first fitting 140 about restricted outlet 144 is a second fitting 146. A primary cleaning fluid inlet 148 of fitting 146 is connected to the concentrated cleaning fluid container 64 by tube 150. The restricted outlet 144 provides a secondary inlet to the second fitting 146. The outlet 152 of the second fitting 146 is connected to cleaning fluid inlet pipe 94 of the mixer 90. The fan or pump 62 provides pressurized air via tubing 154 to an input of the concentrated cleaning fluid container 64 and by tubing 156 to water tank 48 via air port 128. The primary outlet of pump 62 is through conduit 158 to the air manifold of spray nozzle 142.

When the outlet tubing 88 of mixer 90 is totally restricted, no fluid is flowing in the circuitry of FIG. 11. Once the restriction of outlet tubing 88 is removed, water under pressure leaves the tank 48 through tubing 136, nipple 134 and port 132 to raise check valve 138 and the flow through main outlet 142 and tubing 92 to the mixing valve 90. Similarly, concentrated cleaning fluid from container 64 flows via conduit 150 and fitting 146 to tubing 94 and mixer 90. In this state, very little water, if any, exits the restricted outlet 144 from the first fitting 140 into the second fitting 146. For spotting or any other condition wherein the water inlet tubing 92 is restricted, the flow in main outlet 142 of fitting 140 is reduced and therefore the flow in restricted outlet 144 is increased. Although this flow introduces water into the concentrated cleaning fluid, it does not dilute it compared to the unrestricted waterline flow mixture. It also increases the pressure in tubing 94. This allows for greater flow rate of the concentrated cleaning fluid into the mixer 90 and thus the resulting cleaning fluid mixture exiting the mixer 90 has a substantially increased ratio of cleaning fluid to water.

As can be seen from the circuit of FIG. 11, the water and the cleaning fluid supply of the system are pressurized. This produces even control of the fluids such that their mixing ratio and flow rate can be assured. The system also takes advantage of the natural siphoning effect which results from the venturi spray nozzle 42.

Realizing this, the pressure provided by pump 62 via tubing 154 and 156 to the concentrated cleaning fluid supply and the water supply respectively is small compared to the overall air pressure provided via conduit 158 to the venturi spray nozzle 42. Although the pressure supply via tubing 154 and 156 is small, it is very important that it be constant to maintain the desired mixing ratio and flow rates. It should also be noted that by providing the water outlet on the top of tank 48 and the secondary passage 144 of fitting 140 being vertical, the force of gravity helps to further reduce the amount of fluid flowing through restrictive passage 144 into the concentrated cleaning fluid fitting 146.

Figure 14:
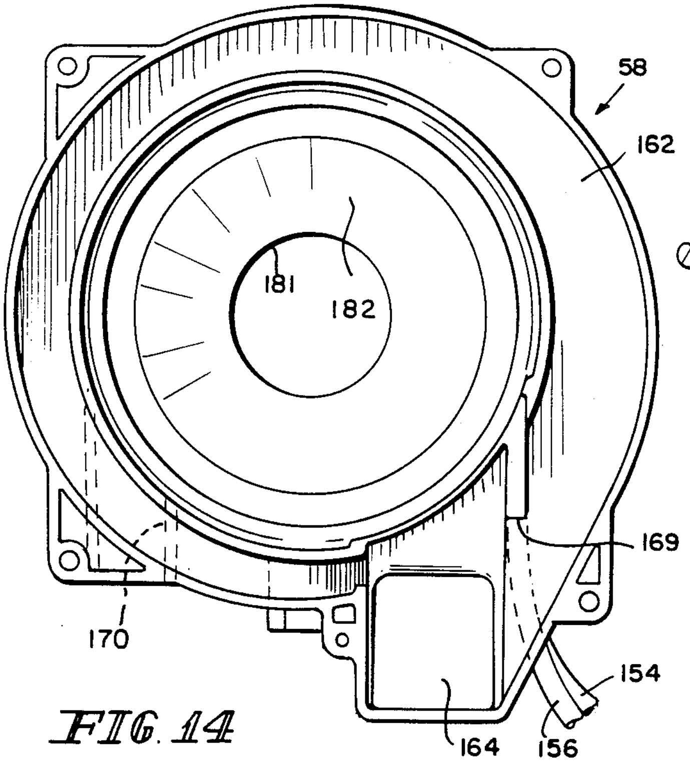
FIG. 14 is a top view of the separator taken along lines 14—14 of FIG. 3.

A pump capable of producing the high air flow rate for the venturi spray nozzle as well as a uniform small flow rate for the pressurized water and cleaning fluid containers is illustrated specifically in FIGS. 3 and 12–14. The separator 58 includes a substantially cylindrical housing 160 with a top rim 162 which forms the housing for the fan or air pump. The pressurized air exiting the chamber formed by the wall of the rim 162 enters tangentially as illustrated in FIG. 14 to a first portion 163 of primary outlet 164. The conduit 158 connected to the venturi spray nozzle is connected to second portion 165 of primary outlet 164.

A pair of secondary smaller outlets 166 and 168 are provided in a wall 169 of the primary outlet 164 and aligned parallel to the flow axis of the second portion of the primary outlet 164. The axis of the secondary outlets 166 and 168 are perpendicular to the flow axis of the second portion of the primary outlet. A ledge or wall 167 extends transverse to the flow axis of the second portion 165 of the primary outlet 164 to create a zone of relatively constant pressure compared to the remainder of the primary outlet. The secondary outlets are adjacent the ledge 167 in this zone. As is evident from the drawings, the cross-sectional area of the primary outlet 164 is quite substantially larger than the cross-sectional area of the secondary outlets 164 and 166. This particular structure provides a uniform pressure at secondary outlets 166 and 168.

Figure 12:
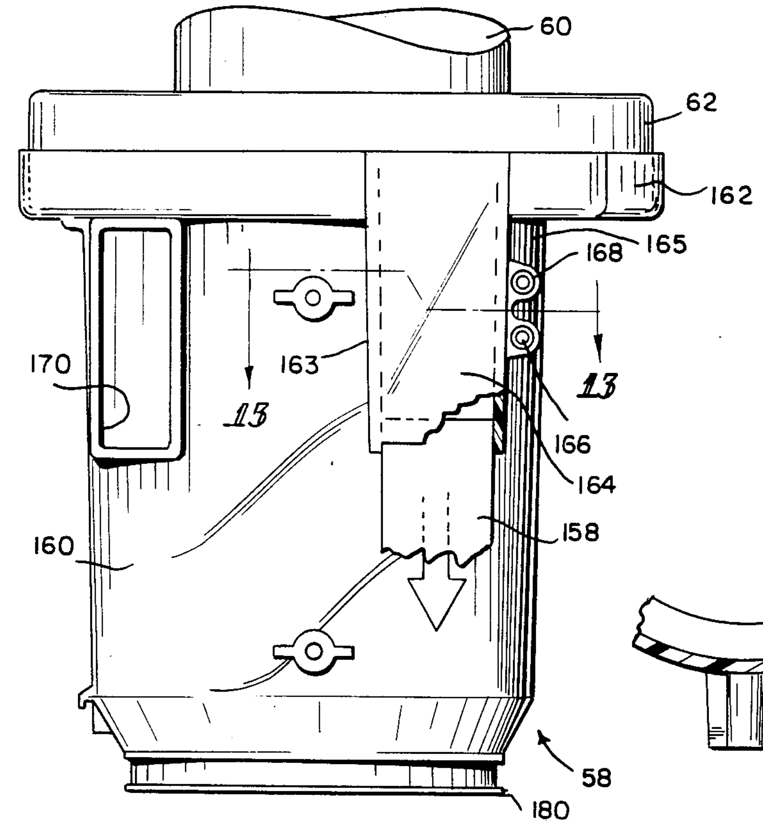
FIG. 12 is a back view of the separator housing incorporating the principles of the present invention.
Figure 13:
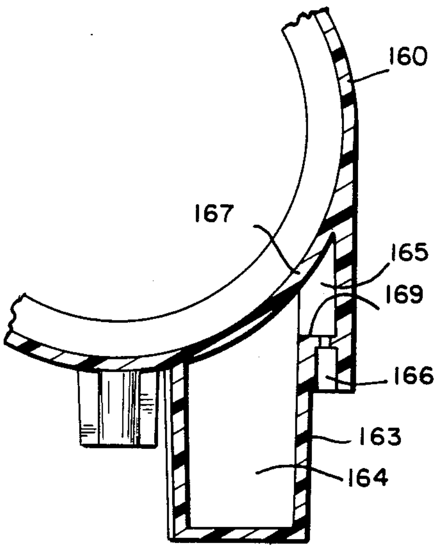
FIG. 13 is a partial cross-section taken along lines 13—13 of FIG. 12.

An air inlet 170 to the separator housing 160 is illustrated in FIG. 12 and provides a flow axis tangential to the cylindrical separator housing 160. This causes a centrifugal flow within the interior. A conical shroud 172, illustrated in FIG. 3 interior the cylindrical housing 160 has interior thereto an air outlet 174 covered by screen 176. The shroud 172 and the outlet 174 are an integral part of plate 178 which is mounted to the cylindrical separator housing 160. Fluid outlet 180 at the bottom of the cylindrical housing is provided at the bottom of the cylindrical separator housing 160. The outlet 174 is displaced vertically and horizontally from the lower edge of the conical shroud 172. Dirty fluid and air enter the separator housing 160 through opening 170 and begin a spiraling down and out motion. The shroud 172 forces the air fluid mixture to the outside of the cylindrical housing or that portion having a greater radius and velocity.

By using a conical shroud, the area at the entry port 170 is not diminished to retard flow of the mixture into the separator chamber while directing the downward moving mixture to the highest velocity portion of the flow thereby maximizing separation of the air and the liquid. The heavier fluid moves towards the cylindrical housing 160 and continues down through outlet 180. The lighter air turns a sharp angle and exits through screen 176 and outlet 174 into the fan or pump 62. The position of the outlet 174 should not be too close to the outer edge of the shroud, otherwise the exiting air will not be completely separated from the fluid. Similarly, if the outlet 174 is displaced too far from the edge of the shroud, the system will choke. The liquid outlet 180 of the separator 58 is connected to the waste fluid tank 50 by a conduit 181.

Figure 15:
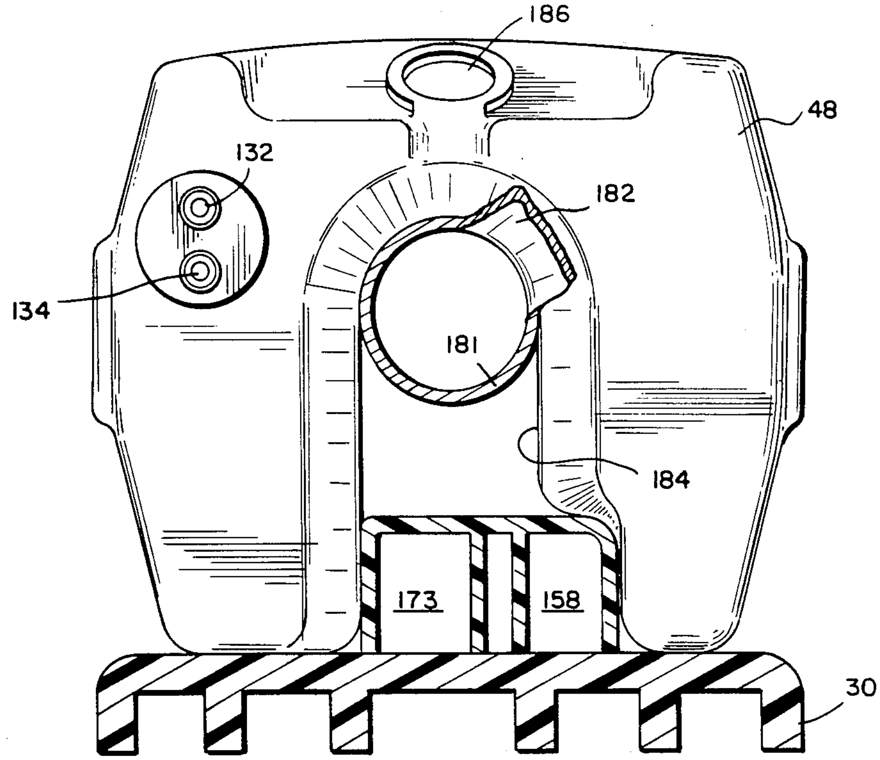
FIG. 15 is a top view of the water tank taken along lines 15—15 of FIG. 3.
Figure 16:
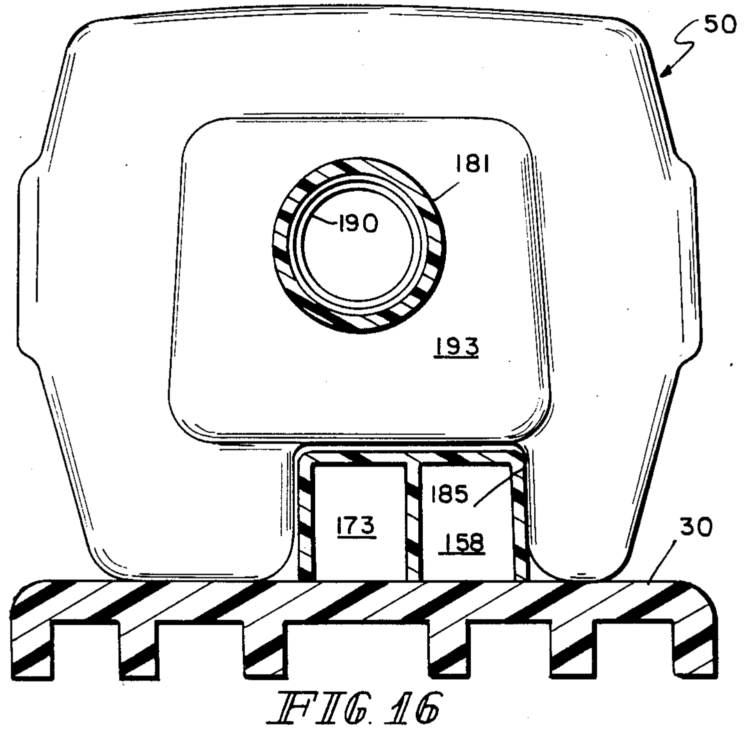
FIG. 16 is a top view of the waste fluid tank taken along lines 16—16 of FIG. 3.
Figure 18:
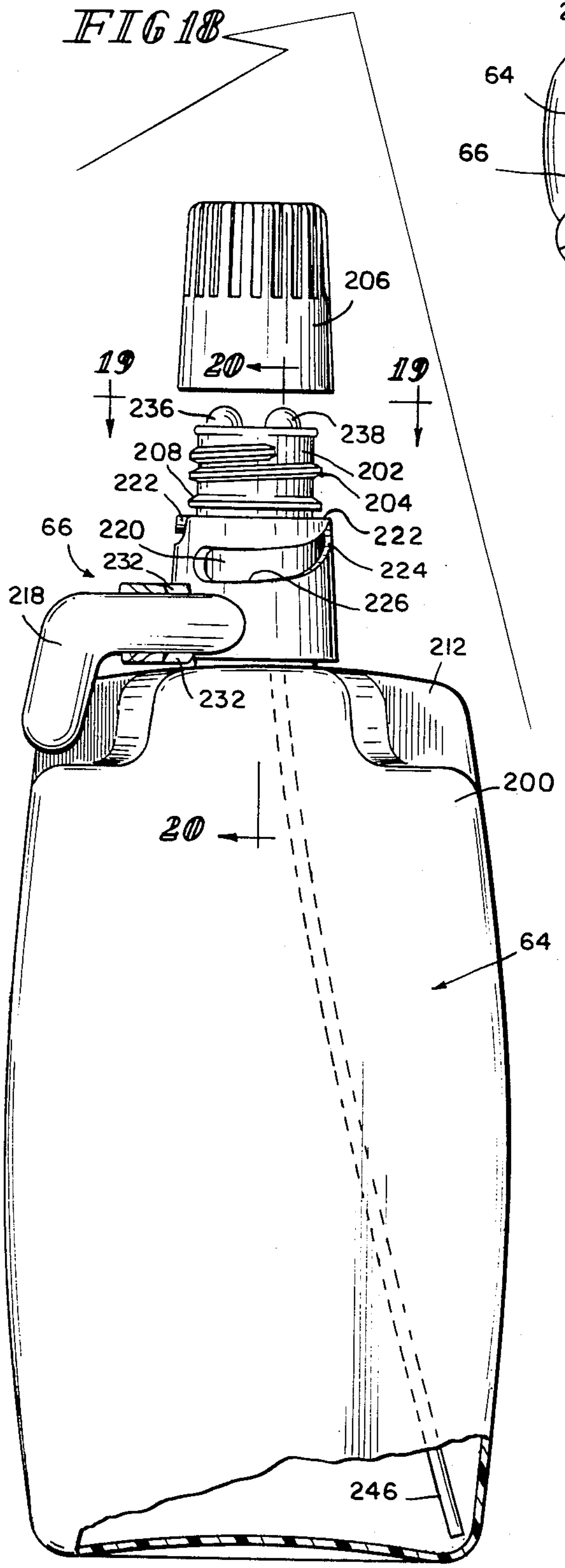
FIG. 18 is a side view of a cleaning fluid cartridge incorporating the principles of the present invention.
Figure 19:
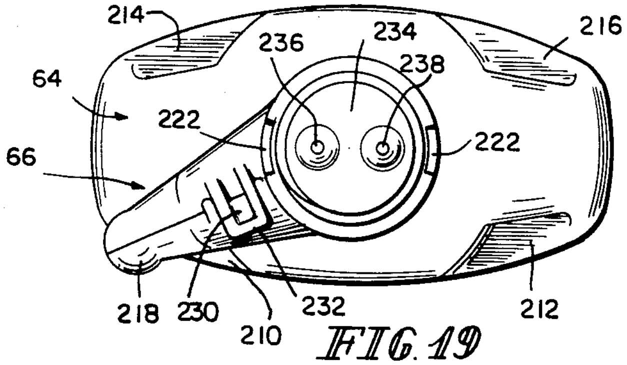
FIG. 19 is a top view taken along lines 19—19 of FIG. 18.
Figure 20:
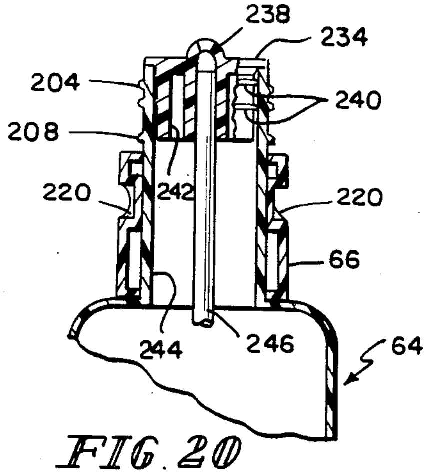
FIG. 20 is a cross-sectional view taken along lines 20—20 of FIG. 18.

The tank assembly including fresh water tank 48 and waste fluid tank 50 is illustrated in FIGS. 3, 15 and 16. The clean water tank 48 includes a U-shaped keyway 184 extending along its length. In the top portion of the keyway as illustrated in FIG. 15 lies the conduit 181 connecting the liquid outlet 180 of the separator 58 and the inlet to the return or dirty fluid tank 50. In the bottom of the keyway mounted to the frame 30 are received air conduit 158 providing pressurized air to the spray nozzle and return conduit 173 bringing waste fluid back from the suction nozzle 46. Thus, the air and fluid conduits 158 and 173 respectively form the key for the tank assembly or unit keyways. Similarly, as illustrated in FIG. 16, the return tank 50 also has a longitudinal U-shaped keyway 185 receiving conduits 158 and 173.

The conduit 181 is flared at 182 at its upper end to provide a funnel and includes a flange 183 extending therefrom to engage the top of the fresh liquid water tank 48 and provide the handle 52 for carrying the tank units. The lower end of conduit 181 includes a rim 191 which is received in an indenture 188 in the neck 190 extending from the return tank 50 into the keyway 184 of the fresh water tank 48. The base 193 of neck 190 is rectangular and is received in rectangular shoulder 195 in the bottom of water tank 48. The fresh water tank 48 has an inlet 186 covered by cap 187 which is secured to the handle 52.

To assemble the tank unit, the waste fluid tank 50 is inserted onto the lower end of the clean water tank with the neck 190 extending into the keyway 184 and base 193 in shoulder 195. The conduit 181 is then inserted from the other end snapping ridge 191 into indenture 188 to mount the conduit to the waste fluid tank and securely mount the clean water tank and the waste fluid tank together. It is evident that the neck 190 and base 193 of the waste fluid tank extending into the keyway and shoulder of the clean water tank 48 stabilizes the tank assembly.

A portion 192 of keyway 185 of the waste fluid tank 50 is inclined to receive a conduit 194 between the fluid return conduit 173 and tube 44 leading to the suction nozzle 46. The bottom of the tank 50 includes a recess 196 (FIG. 1) having a camming surface 198 therein. As illustrated in FIG. 3, the cam latch 54 lies in the recess 196 and rests against the camming surface 198 of the return tank 50. As will be explained more fully, the cam latch 54 will be rotated into recess 196 to initially align and ride on camming surface 198 to move the tank assembly along the keys formed by conduits 158 and 173 into alignment with the upper housing 56. This mates the flared portion 182 of conduit 181 with the outlet 180 of the separator 58 as well as nipples 132 and 134 into port 128 and 130 respectively of block 126.

Figure 17:
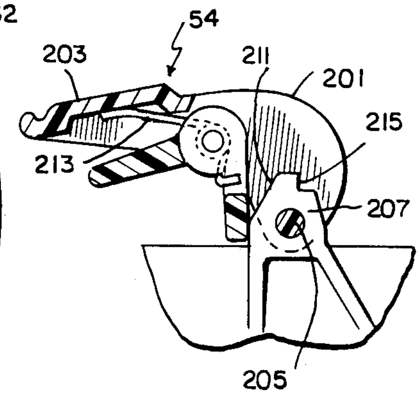
FIG. 17 is a cross-sectional view of the cam latch device in its unlatched position.

As illustrated in FIGS. 3 and 17, the cam latch 54 includes a substantially L-shaped handle 203 having a camming surface 201 and a lever portion 203. The camming surface 201 engages the camming surface 198 in the bottom of the waste fluid tank 50. The handle 54 is pivotally mounted at its lower end at 205 to the block 207 of the frame 30. An L-shaped latch 209 is pivotally connected at 211 the juncture of the legs to the L-shaped handle 203. A spring 213 engages the interior of handle 203 and one of the legs of latch 209 to bias the latch counter-clockwise relative to the handle as illustrated in FIGS. 3 and 17. A ridge or shoulder 215 in the block 207 forms a catch for a leg of latch 209 which acts as a detent to lock the cam latch in the position illustrated in FIG. 3. The unlatch position, allowing removal of the tank assembly from the cleaning device, is illustrated in FIG. 17.

In order to release the cam latch 54 from the position illustrated in FIG. 3, the latch 209 is rotated clockwise against the spring 213 with the handle 203 stationary allowing the detent and the latch 209 to ride out of the cam latch or ridge 215 on block 207. The cam latch 54 may then be rotated counter-clockwise. To mount the tank assembly to the cleaning device, the tank assembly is mounted with the keyways 184 and 185 on the keys formed by conduits 158 and 173 and 194. The cam latch 54 is rotated back into recess 196 in the bottom of return tank 50 and engages camming surface 198. The detent portion 209 of latch 209 rides along the exterior edge 217 of block 207 until it exceeds the top thereof and falls into the catch 215.

The unique cartridge 64 including collar 66 is illustrated in FIGS. 18–21. The cartridge 64 includes a non-circular body 200 having a neck 202 extending therefrom. Threaded portions 204 on neck 202 receives cap 206. A circumferential ridge 208 on neck 202 retains the collar 66 between the top of the cartridge and the ridge 208 such that the collar may rotate relative to the cartridge 64 without any axial motion between the collar and cartridge. The sides of the cartridge adjacent the top includes four indentures 210, 212, 214 and 216. Indentures 210 and 212 receive a handle 218 extending from collar 66 to define two distinct positions of the collar relative to the body. As will be explained more fully below, when the handle 218 is in recess 210, the collar 66 is in its initial angular position capable of entering into the docking port 68 of the cleaning device. As the collar 66 is rotated counter-clockwise in FIG. 19, the handle will be received in recess 212 which will define a final locked angular position of the collar in the docking port. It should also be noted that the recess 210 allows the handle to be received substantially within the body 200 and therefore allows for easy packaging.

Figure 21:
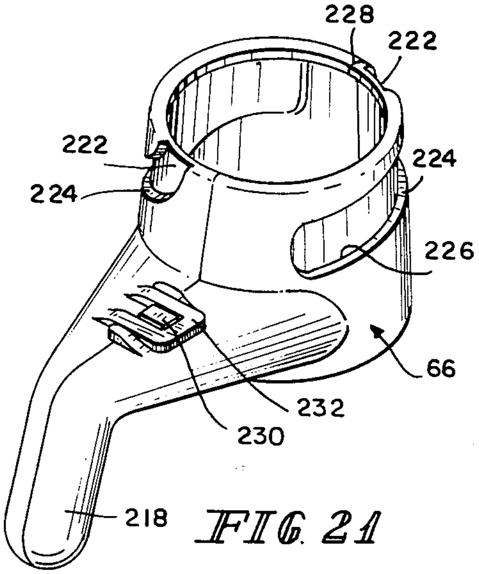
FIG. 21 is a perspective of a collar incorporating the principles of the present invention.

The collar 66 includes a pair of camming recesses 220 therein to receive a pair of tabs in the docking port of the cleaning device. Each recess 220 includes an entry slot 222 on the top of the collar connected respectively to a inclined portion 224 followed by a horizontal lock portion 226. A pair of lugs 260 (FIG. 22) on the docking port 68 are received in entry slots 222 and the collar is rotated relative to the body causing the total assembly to move axially without rotation of the cartridge 64. The lugs 260 ride down the inclined portion 224 along portion 226 to lock the collar and cartridge in place in the docking port. The locking portion 226 prevents reverse rotation by vibration or use of the cleaning device. Since the cartridge is part of a pressure fluid system, it is important that the docking be firm and secure for proper operation of the cleaning device. Thus, alignment and airtight connection is critical. As illustrated in FIG. 21, the collar 66 is formed of two portions connected by an integral lying hinge 228. The collar is wrapped around the neck 202 below ridge 208 with latch 232 locking on top of catch 230.

Indentures 214 and 216 receive shoulders or keys in the docking port to align and restrain the cartridge from rotating during axial insertion into the docking port by hand as well as by rotation of the collar 66.

Received in the top opening of the bottle neck 202 is an insert 234 having a pair of nozzles 236 and 238 thereon. As will be explained below, these nozzles are aligned with ports in the docking port with nozzle 236 being an air inlet and nozzle 238 being a fluid outlet. The insert 234 has a pair of circumferial ridges 240 which engage and seal the insert against the interior of the neck 202. As previously discussed, this is a positive pressure supply system and therefore this seal must be maintained. An axial keyway 242 is provided in the insert 234 and is received in key 244 running along the interior of the neck 202. This aligns the insert 234 and the nozzles 236 and 238 to the cartridge and consequently to the collar. This assures alignment of the nozzle and the appropriate inlet and outlet of the docking port. A tube 246 extends from the bottom of the body 200 to the fluid outlet nozzle 238.

Figure 22:
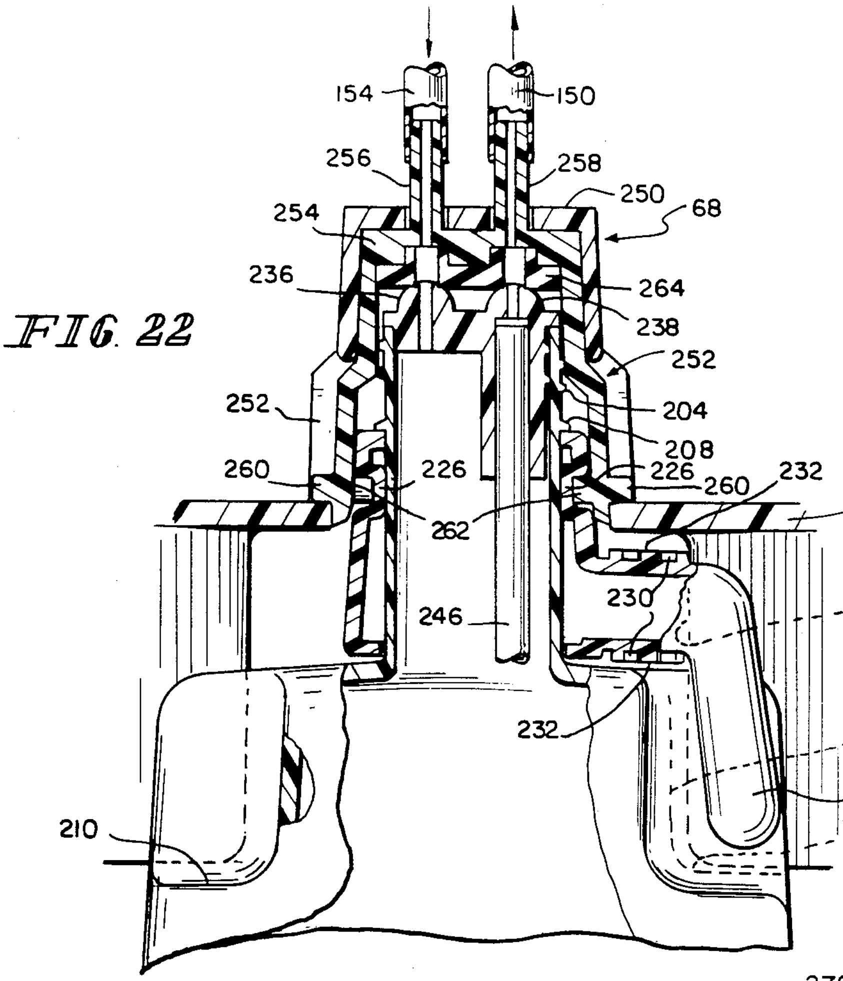
FIG. 22 is a cross-sectional view of the cartridge and docking port incorporating the principles of the present invention.

The cartridge 64 in docking port 68 is illustrated in detail in FIG. 22. The docking port is an assembly which includes a docking housing 250 mounted to the upper housing 56. A pair of opposed slots 252 are provided in the docking housing 250. A U-shaped clip 254 is inserted in the docking housing having a pair of nipples 256 and 258 extending through the housing 250 to receive air inlet conduit 154 from the outlet of the pump and cleaning fluid supply tubing 150 leading to the second fitting 146 (see FIG. 11). The outer edges of the U-shaped clip 254 has tabs 260 which engage the bottom of the slots 252 in the docking housing to maintain the clip therein. Extending to the interior of the docking housing are a pair of lugs 262. These lugs form the complementary camming surfaces to be used with the camming recesses 220 in the collar 66. A molded rubber sealing disc 264 is received in the U-shaped clip 254.

By using a clip 254 to be inserted through the docking housing, it can be made of hard material capable of many insertions on the camming surface. For example, it may be made of Delrin plastic. This reduces the cost of the overall device by making the shaped clip of such expensive material instead of requiring the whole docking housing to be so made. The molded rubber seal 264 creates an airtight seal since it receives nozzles 236 and 238 on the container and deforms as the container is moved axially within the docking housing. A pair of shoulders 266 and 268 extend from the housing wall 56 and provide guides or key for indentures 214 and 216 of the cartridge.

As can be seen from FIGS. 2 and 22, the cartridge 64 lies in a chamber in the upper housing 56 with the neck portion 252 extending into a recess portion and the body 200 lying in a cavity portion of the chamber. The cavity encompasses at least three of the sides of the body.

A cartridge 64 of concentrated cleaning fluid may be mounted to the docking port 68 by aligning the indentures 214 and 216 of the cartridge with shoulders 266 and 268 of the housing, respectively. The collar 66 is placed in its initial or insertion position as defined by the handle 218 lying in indenture 210 of the body. The body and collar are moved axially until the lugs 262 of the docking port are received in entry slots 222 in the top of the collar. The collar 66 is then rotated by handle 218 accessible from the exterior of the cavity causing the body and collar to move axially during rotation of the collar. The indentures 214 and 216 engage the shoulders 266 and 268 to prevent the cartridge 64 from rotating. The collar is rotated to its final or lock position defined by the handle 218 being received in indenture 212 on the body. In this position, orifices in nozzles 236 and 238 are aligned and received with apertures in the base of nipples 256 and 258. The insert 234 having a keyway assures alignment of the nozzles with the body and the camming recess 220 of the collar with tabs 262 assure initial alignment as well as indentures 214 and 216 of the body and shoulders 266 and 268 of the housing assure initial alignment of the body and nozzles during the axial movement of the body produced by rotation of the collar 66.

Figure 23:
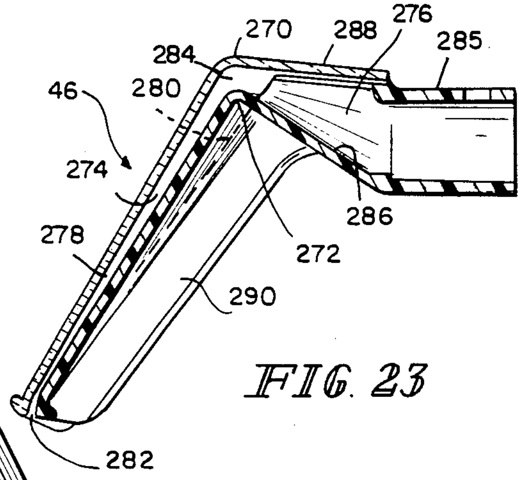
FIG. 23 is a cross-sectional view of the suction nozzle taken along lines 23—23 of FIG. 24.
Figure 24:
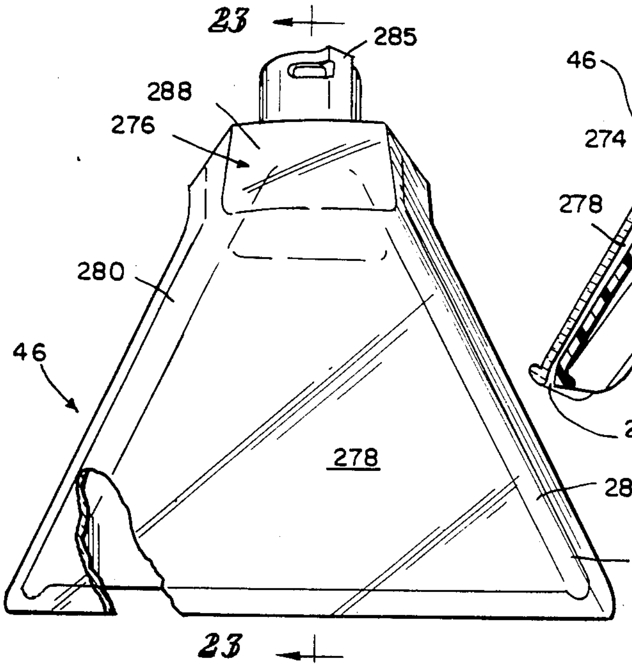
FIG. 24 is a perspective view of the suction nozzle.

The suction nozzle 46 of the present invention as illustrated in FIGS. 23 and 24 is composed of a front-top piece 270 and a back-bottom piece 272 joined by appropriate fasteners. The nozzle includes a first or inlet passage 274 and a second or outlet passage 276. The inlet passage 274 is generally U-shaped along a cross-section transverse to the flow axis having a flat bight portion 278 and a pair of short leg portions 280. The front flat bight portion 278 has a substantially triangular configuration diminishing from the base or nozzle inlet 282 to its juncture 284 with the outlet passage 276. As can be seen from FIG. 23, the distance of separation between the front and back portions of the walls of the front and bottom pieces 270 and 272, respectively increase from the base or inlet portion 282 to the juncture 284 between the inlet, first passage 274 and the outlet, second passage 276. This change of distance of separation compensates for the diminishing triangular portion of the front and back faces such that the cross-sectional area of the inlet passage 274 is substantially equal along the flow axis. This allows a uniform draw or suction throughout the inlet passage 278 and prevents fluid from hanging up and flowing back out the inlet 282.

The second passage or outlet passage 276 as illustrated in FIG. 23 has a generally triangular cross-section along the flow axis such that its cross-sectional area, transfers to the flow axis, increases along the flow axis. A cylindrical connector portion 285 receives pipe 44 of the housing. The bottom wall 286 of the outlet passage extends diagonally across the connector inlet 284 (see FIG. 3). Thus, the projected axis of the pipe 44 and outlet connector 285 intersects the first, inlet passage 278 below the juncture 284 of the inlet and outlet passages 274 and 276, respectively, and forms an oblique angle therewith. Thus, the outlet passage 276 forms a horizontal trough to collect fluid which will drip from the conduits between the nozzle 46 and the fluid separator 58 when the motor and suction system are deactivated. Thus, no fluid will exit the outlet 282 when the device is turned off.

In order for the user to determine the condition of the extracted fluid being drawn through nozzle inlet 282, at least the top wall 288 of the outlet section 276 should be transparent. The front, top and sides of the top piece of the nozzle 46 are transparent. This allows viewing of the fluid by the user during use. The operator cannot see the front wall of passage 274 since he generally stands behind the device during use. To further increase visibility of the fluid, the enlarged cross-sectional area of the trough 276 causes a pressure drop to slow down the fluid at the juncture or intersection 284. The bottom wall 286 maintains the fluid adjacent the top wall 288 for better vieweing. When this fluid is slowed down, the exact content and color can be more readily ascertained. It should also be noted that by providing the front or inlet passage 274 as U-shaped, the fluid from legs 280 on entering the outlet passage 276 intersect the primary flow from the bight portion 280 and create eddy currents at their junction. These eddy currents further slow down the fluid in the viewing area.

To further increase visibility, the back and bottom walls 272 of the bottom piece should be made of non-transparent material. Preferably, they should be white such that additional light may be provided from the back to illuminate the extracted fluids. It should be noted that the outside side walls are extended at 290 to provide a shield for the spray head nozzle 42 to prevent water from being sprayed outside the suction nozzle 46.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. A cleaning device comprising:

a source of water;

a source of cleaning fluid;

mixing means having water and cleaning fluid inlets connected to said water and cleaning fluid sources respectively for mixing said water and cleaning fluid and dispensing a mixture at an outlet of said mixing means;

a nozzle connected to said mixing means outlet;

control means connected to said mixing means and having a single moveable member for valving the flow of at least one of said water and cleaning fluid inlets to said mixing means and the flow from said mixing means outlet for determining the rate of flow at said outlet and determining the mixing ratio of water and cleaning fluid; and said control means including a first restriction means operated by said member and connected to said mixing means outlet for determining the rate of flow at said outlet and a second restriction means operated by said member and connected to a water inlet of said mixing means for determining said mixing ratio.

2. A cleaning device according to claim 1 wherein said first restriction means includes a first anvil and a first hammer adjacent said mixing means outlet whereby the position of said first hammer relative to said first anvil determines said flow rate, and said second restriction means includes a second anvil and a second hammer adjacent said water inlet whereby the position of said second hammer relative to said second anvil determines said mixing ratio, said first and second hammer being disposed on said member.

3. A cleaning device according to claim 2 wherein said member is a rocker arm and said first and second hammers are portions of the rocker and are separated by the pivot point of said rocker arm.

4. A cleaning device according to claim 3 wherein said control means includes means for biasing said rocker arm to an angular position having said outlet completely restricted by said first hammer and anvil.

5. A cleaning device according to claim 3 wherein said rocker arm has a first pivotal position having the outlet completely restricted by said first hammer and anvil, a plurality of first intermediate angular positions having intermediate restriction of said outlet by said first hammer and anvil, and a second plurality of intermediate angular positions having intermediate restriction of said water inlet by said second hammer and anvil.

6. A cleaning device according to claim 5 wherein said water inlet is unrestricted at said first position and said plurality of first intermediate positions, and said mixing means outlet is unrestricted at said plurality of second intermediate positions.

7. A cleaning device according to claim 2 wherein said control means include means for biasing said member to bring said first hammer towards said first anvil and said second hammer away from said second anvil.

8. A cleaning device according to claim 1 wherein said control means include means connected to said member to bring said first and second restriction means for initially setting said first and second restriction means to zero flow rate and maximum water to cleaning fluid ratio respectively.

9. A cleaning device according to claim 1 wherein said control means includes a common actuator means connected to said member and thereby to said first and second restriction means, said actuator means having means for moving said member and sequentially operating said first and second restriction means.

10. A cleaning device comprising:

a source of water;

a source of cleaning fluid;

mixing means having water and cleaning fluid inlets connected to said water and cleaning fluid sources respectively for mixing said water and cleaning fluid and dispensing a mixture at an outlet of said mixing means;

a nozzle connected to said mixing means outlet;

a first restriction means connected to said outlet for varying the restriction of said outlet from an initial totally restricted position;

a second restriction means connected to said water inlet for varying the restriction of said water inlet from an initial unrestricted position; and actuator means including a control member common to said first and second restriction means for sequentially operating said first and second restriction means to control the flow to said nozzle and then controlling the concentration of said cleaning fluid in said mixture.

11. A cleaning device according to claim 10 wherein said actuator means includes means for biasing said first and second actuator means to their initial positions.

12. A cleaning device according to claim 10 wherein said first and second restriction means includes a first and second anvil respectively, and said actuator means control member includes a rocker arm having a pivot point and first and second hammers separated by the pivot point of said rocker arm and opposite said first and second anvils, respectively.

13. A cleaning device according to claim 12 wherein said rocker arm has a first pivotal position having the outlet completely restricted by said first hammer and anvil, a plurality of first intermediate angular position having intermediate restriction of said inlet by said first hammer and anvil, and a second plurality of intermediate angular positions having intermediate restriction of said water inlet by said second hammer and anvil.

14. A cleaning device according to claim 13 wherein said water inlet is unrestricted at said first position and said plurality of first intermediate positions, and said mixing means outlet is unrestricted at said plurality of second intermediate positions.

* * * * *